US011631259B2

(12) United States Patent
Burzo et al.

(10) Patent No.: US 11,631,259 B2
(45) Date of Patent: Apr. 18, 2023

(54) MULTIMODAL SENSING OF THERMAL COMFORT FOR ADAPTABLE CLIMATE CONTROL

(71) Applicant: THE REGENTS OF THE UNIVERSITY OF MICHIGAN, Ann Arbor, MI (US)

(72) Inventors: Mihai G. Burzo, Ann Arbor, MI (US); Rada Mihalcea, Ann Arbor, MI (US); Mohamed Abouelenien, Dearborn, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 664 days.

(21) Appl. No.: 16/671,841

(22) Filed: Nov. 1, 2019

(65) Prior Publication Data
US 2020/0143180 A1  May 7, 2020

Related U.S. Application Data

(60) Provisional application No. 62/754,704, filed on Nov. 2, 2018.

(51) Int. Cl.
*G06V 20/59* (2022.01)
*G06K 9/62* (2022.01)
(Continued)

(52) U.S. Cl.
CPC .............. *G06V 20/593* (2022.01); *G01J 5/10* (2013.01); *G06K 9/6256* (2013.01);
(Continued)

(58) Field of Classification Search
CPC .... G06V 20/593; G06V 10/40; G06V 10/143; G06K 9/6256
See application file for complete search history.

(56) References Cited

U.S. PATENT DOCUMENTS

| 2015/0247647 A1* | 9/2015 | Kusukame | ............... F24F 11/52 700/299 |
| 2017/0268793 A1* | 9/2017 | Cardonha | ............ G06V 40/103 |
| 2018/0119973 A1* | 5/2018 | Rothman | ................. F24F 11/62 |

OTHER PUBLICATIONS

Burzo, Mihai, et al. "Using infrared thermography and biosensors to detect thermal discomfort in a building's inhabitants." ASME International Mechanical Engineering Congress and Exposition. vol. 46521. American Society of Mechanical Engineers, 2014. (Year: 2014).*

Abouelenien, Mohamed, Mihai Burzo, and Rada Mihalcea. "Human acute stress detection via integration of physiological signals and thermal imaging." Proceedings of the 9th ACM international conference on pervasive technologies related to assistive environments. 2016. (Year: 2016).*

(Continued)

*Primary Examiner* — David Perlman
(74) *Attorney, Agent, or Firm* — Harness, Dickey & Pierce, P.L.C.

(57) ABSTRACT

An adaptable climate control method for controlling a thermal climate within a confined space based on thermal and/or physiological features of one or more occupants of the confined space is provided. The method includes receiving thermal images of a plurality of target areas from the occupants, identifying a plurality of interesting points of the received thermal images, and isolating the interesting points to construct thermal maps of the target areas. Thermal features of the occupants are determined using the respective thermal maps and the thermal features are used to construct thermal feature vectors for the occupants. Physiological features from physiological sensors can also be added as elements of the thermal feature vectors to form integrated vectors. The thermal feature vectors and/or integrated vectors are classified using a classifiers and at least a portion of the thermal climate of the confined space is adjusted based on the classification of the vectors.

20 Claims, 11 Drawing Sheets

(51) Int. Cl.
*G06N 20/00* (2019.01)
*G01J 5/10* (2006.01)
*G06V 10/40* (2022.01)
*G06V 10/143* (2022.01)
*G01J 5/00* (2022.01)
*F24F 11/63* (2018.01)
*F24F 120/00* (2018.01)
*B60H 1/00* (2006.01)

(52) U.S. Cl.
CPC .......... *G06K 9/6268* (2013.01); *G06N 20/00* (2019.01); *G06V 10/143* (2022.01); *G06V 10/40* (2022.01); *B60H 1/00742* (2013.01); *F24F 11/63* (2018.01); *F24F 2120/00* (2018.01); *G01J 2005/0077* (2013.01); *G06V 2201/07* (2022.01)

(56) References Cited

OTHER PUBLICATIONS

Mohamed Abouelenien, et al., Detecting Human Thermal Discomfort via Physiological Signals, PETRA Conference '17, Jun. 21-23, 2017, Islands of Rhodes, Greece.

Mihai Burzo, et al., Thermal Discomfort Detection Using Thermal Imaging, IMECE2017-72162, Nov. 3-9, 2017, Tampa, Florida.

Mihai Burzo, et al., Automated Detection of Human Thermal Discomfort for Energy Efficient Buildings, MDPI 2018.

Mohamed Abouelenien, et al., Detecting Thermal Discomfort Using Physiological Signals and Thermal Imaging for Automatic Climate Control in Vehicles, ACM Multimedia '17, Mountain View, CA 2017.

* cited by examiner

MULTIMODAL SENSING OF THERMAL COMFORT FOR ADAPTABLE CLIMATE CONTROL

CROSS-REFERENCE TO RELATED APPLICATIONS

This application claims the benefit of U.S. Provisional Application No. 62/754,704, filed on Nov. 2, 2018. The entire disclosure of the above application is incorporated herein by reference.

FIELD

The present disclosure relates to adaptable climate control for vehicles and buildings and multimodal sensing methods for detecting thermal comfort relating thereto.

BACKGROUND

Energy management in both buildings and vehicles impacts overall energy consumption and has important consequences for the climate and the environment. For example, vehicle air conditioning may consume up to 30% of the fuel in conventional internal combustion engine vehicles and may reduce the range of a vehicle's battery by up to 40% in electric cars. Studies suggested that raising a vehicle's temperature by four degrees Celsius may save approximately 22% of the compressor power which may lead to a 13% increase in the coefficient of performance.

The traditional and most widely used means of controlling the vehicle's environment is through a static environmental condition control, which maintains the driver's space in a selected state until the driver manually adjusts the temperature, assumed to maintain their comfort sensation. Such manual adjustments result in increased energy consumption and do not ensure a permanent thermal comfort sensation. In various aspects, automatic detection of human thermal discomfort using a multimodal approach can be used to reduce energy consumption, while maintaining the thermal comfort sensation of the building's or vehicle's occupants.

A variety of different personal and environmental factors control the thermal sensation of individuals. For example, personal factors include metabolic rate and clothing insulation, while environmental factors include air temperature, mean radiant temperature, air velocity, and relative humidity. Moreover, other human factors, such as subjective assessment and psychological aspects, add to the complexity of the thermal discomfort detection process. Accordingly, in order to be able to detect discomfort levels of humans efficiently and effectively, automatic detection systems should consider and account for both physiological and thermal measurements.

This section provides background information related to the present disclosure which is not necessarily prior art.

SUMMARY

This section provides a general summary of the disclosure, and is not a comprehensive disclosure of its full scope or all of its features.

In various aspects, the present disclosure provides an adaptable climate control method for controlling a thermal climate of a confined space based on thermal features of an occupant of the confined space. The method includes receiving, by a computer processor, a thermal image of a target area of the occupant, and identifying, by the computer processor, a plurality of interesting points of the received thermal image. The plurality of interesting points may be isolated by the computer processor to construct a thermal map of the target area. The computer processor using the thermal map may determine the thermal features of the occupant, and the computer processor using the thermal features of the occupant may construct a thermal feature vector that may be classified by the computer processor using one or more classifiers. The computer processor may adjust at least a portion of the thermal climate of the confined space in accordance with the classification of the thermal feature vector.

In one aspect, the method may further include storing, by the computer processor, the thermal feature vector and its classification. The computer processor may train the one or more classifiers using the stored information.

In one aspect, when applying the one or more classifiers, the computer processor may detect one of a cold state, a comfort state, and a hot state of the occupant.

In one aspect, when applying the one or more classifiers, the computer processor may further calculate a level of discomfort within at least one of the cold state and the hot state of the occupant.

In one aspect, the one or more classifiers are embedded in a supervised classification method.

In one aspect, isolating the plurality of interesting points to construct the thermal map may include, by the computer processor, binarizing the received thermal image to form a binarized thermal image. The binarized thermal image is a holistic shape of the target area of the occupant. The binarized thermal image may be multiplied with the received thermal image to construct a restored thermal image of the target area. The method may further include cropping the restored thermal image to construct the thermal map of the target area.

In one aspect, the thermal feature vector may be constructed from a plurality of thermal images collected over a predetermined time period.

In one aspect, the method may further include, by the computer processor, receiving physiological data from at least one physiological sensor; integrating the physiological data as one or more additional elements in the thermal feature vector to form an integrated thermal feature vector; classifying the integrated thermal feature vector using the one or more classifiers; and adjusting the thermal climate of the confined space using the classification of the integrated thermal feature vector.

In one aspect, the computer processor further integrates as one or more other additional element into the thermal feature vector to form a further integrated thermal feature vector information relating to the occupant including at least one of the occupant's clothing and metabolic rate In one aspect, the computer processor further integrates as one or more other additional element into the thermal feature vector to form a further integrated thermal feature vector information relating to the environment.

In one aspect, the environmental information includes data relating to environmental humidity.

In one aspect, a thermal image of the target area of the occupant may be captured and received from one or more thermal cameras, and the interesting points correspond with areas having higher concentrations of blood vessels as compared to the surrounding areas.

In one aspect, a maximum distance between each interesting point of the plurality of interesting points is less than or equal to about 5 pixels.

In various other aspects, the present disclosure provides an adaptable climate control method for controlling a thermal climate of a vehicle or building based on thermal features of one or more occupants of the vehicle or building. The method includes receiving, by a computer processor, a first thermal image of a target area of a first occupant and a first set of physiological data from a first physiological sensor in communication with the first occupant. A first plurality of interesting points may be identified on the received first thermal image. The method may further include isolating the first plurality of interesting points to construct a first thermal map of the target area of the first occupant. The thermal features of the first occupant may be determined using the thermal map of the target area, and a first thermal feature vector may be constructed using the thermal features of the first occupant. A first set of physiological data may be integrated as one or more additional element into the first thermal feature vector to form a first integrated thermal feature vector. The method further includes detecting, by the computer processor, at least one of a cold state, a comfort state, and a hot state of the first occupant using the first integrated thermal feature vector. The method also includes, by the computer processor, the thermal climate of the vehicle or building based on the detection of one of the cold state or the hot state.

In one aspect, the method further includes receiving, by a computer processor, a second thermal image of a target area of a second occupant and a second set of physiological data from a second physiological sensor in communication with the second occupant. A second plurality of interesting points is identified by the computer process on the received second thermal image. The second plurality of interesting points are isolated to construct a second thermal map of the target area of the second occupant. Thermal features of the second occupant are determined using the thermal map of the target area and a second thermal feature vector is constructed using the thermal features of the second occupant. A second set of physiological data may be integrated as one or more additional element into the second thermal feature vector to form a second integrated thermal feature vector. The method also includes, detecting, by the computer processor, at least one of a cold state, a comfort state, and a hot state of the second occupant using the second integrated thermal feature vector.

In one aspect, the method may further include determining a level of cold state discomfort or a level of hot state discomfort of the first occupant; and determining a level of cold state discomfort or a level of hot state discomfort of the second occupant.

In one aspect, the computer processor may adjust the thermal climate of the vehicle or building based on a combination of the level of cold state discomfort or a level of hot state discomfort of the first occupant and the level of cold state discomfort or a level of hot state discomfort of the second occupant.

In one aspect, adjusting is a first adjustment of a first portion of the thermal climate based on the detection of one of the cold state or the hot state of the first occupant, and the method further includes a second adjustment of a second portion of the thermal climate based on the detection of one of the cold state or the hot state of the second occupant.

In one aspect, the method may further include storing, by the computer processor, the first and second thermal feature vectors, the detection of the first and second thermal feature vectors, and the first and second adjustments; and training, by the computer processor, the detection system using the stored information.

In one aspect, isolating the first plurality of interesting points to construct the first thermal map and isolating the second plurality of interesting points to construct the second thermal map each includes binarizing, by the computer processor, the received first or second thermal image to form a binarized image. The binarized image may be a holistic shape of the target area of the first or second occupant. The binarized first or second thermal image and the received first or second thermal image may be multiplied to construct a restored first or second thermal image of the target area; and cropping, by the computer processor, the restored first or second thermal image to construct the thermal map of the target area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In the trade-off between thermal comfort and reduced energy consumption, automated detection of the thermal sensation levels of individuals and automatic adjustments in accordance with such is critical. As noted above, different personal and environmental factors control the thermal sensation of individuals. For example, personal factors include individual metabolic rates and clothing insulation, while environmental factors include air temperature, mean radiant temperature, air velocity, and relative humidity. Moreover, other human factors such as subjective assessment and psychological aspects add to the complexity of the thermal discomfort detection process. As such, a multimodal approach integrating features from thermal and physiological modalities should be used to automatically and reliably detect human thermal discomfort.

Figure 1:
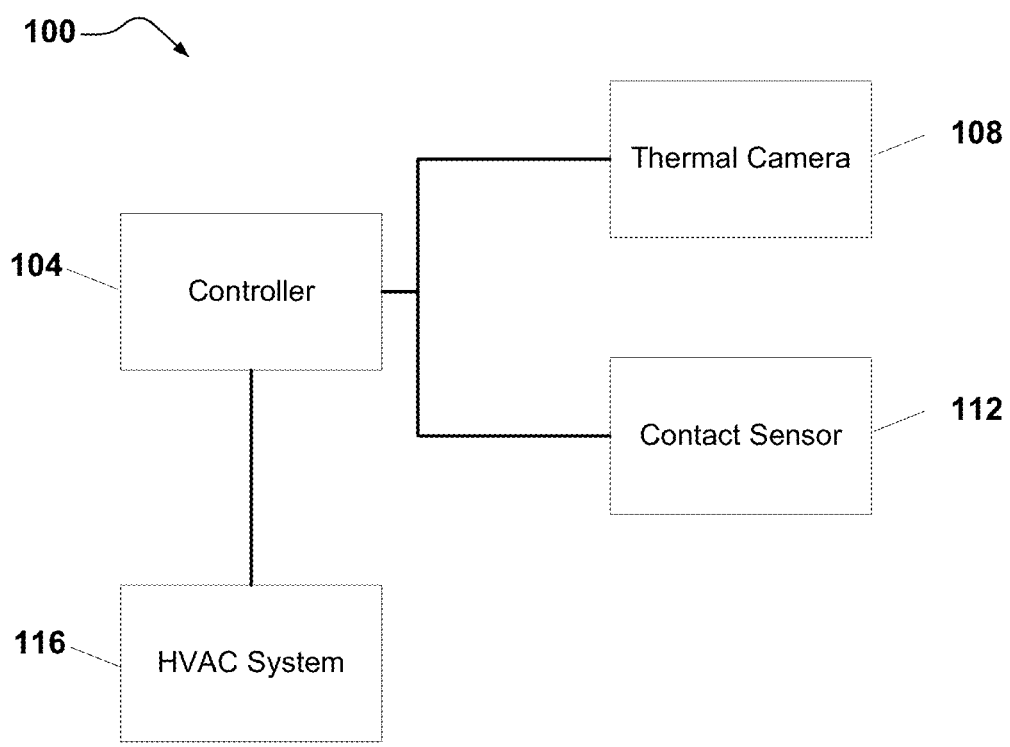
FIG. 1 is a block diagram overview of an example adaptable climate control system according to some embodiments of the present disclosure.

FIG. 1 provides a block diagram overview that illustrates an example adaptable climate control system 100. The system 100 comprises a controller or computer processer 104 that is in communication with at least one of a thermal camera 108 and one or more physiological sensors 112. In various aspects, the thermal camera 108 captures a thermal image of one or more building or vehicle occupants, and the one or more physiological sensors 112 collects physiological data or features from the one or more building or vehicle occupants. The physiological features may include, for example, one or more of the occupant's heart rate, blood volume pulse ("BVP"), skin conductance ("SC"), respiration rate ("RR"), and skin temperature ("ST"). In certain instances, the one or more of the physiological sensors 112 may make at least transitory contact with the one or more building or vehicle occupants so as to collect the selected physiological data. For example, the one or more physiological sensors 112 may be incorporated into one or more of the driving wheel and the driver seat, as well as one or more of the passenger seats. In various aspects, one of the thermal camera 108 and the physiological sensors 112 may provide the controller 104 with personal information relating to the occupant including, for example, information relating to the occupant's clothing and/or metabolic rate. In still further variations, one of the thermal camera 108 and the physiological sensors 112 may provide the controller 104 with environmental information, such as, for example, data relating to environmental humidity.

In various aspects, the controller 104 may be in further communication with a thermal climate control system 116, such as an HVAC system of a vehicle or building. As further detailed below, the controller 104 may construct one or more thermal feature vectors using the data from the thermal camera 108 and/or the one or more contact sensors 112 and may classify the one or more thermal feature vectors so as to determine the thermal comfort of the one or more building or vehicle occupants. In certain variations, the controller 104 may automatically adjust at least a portion of the thermal climate of the vehicle or building in accordance with the classification of the one or more thermal feature vectors. For example, the controller 104 may automatically adjust a first portion of the vehicle or building in accordance with the classification of a first thermal feature vector illustrating the thermal comfort of a first occupant of the vehicle or building. The controller 104 may automatically adjust a second portion of the vehicle or building in accordance with the classification of a second thermal feature vector illustrating the thermal comfort of a second occupant of the vehicle or building. Though the following discussion is directed to single occupant, the skilled artisan will appreciate that the same teachings may be applied in situations having one or more vehicle or building occupants and one or more corresponding vehicle or building zones.

Figure 2:
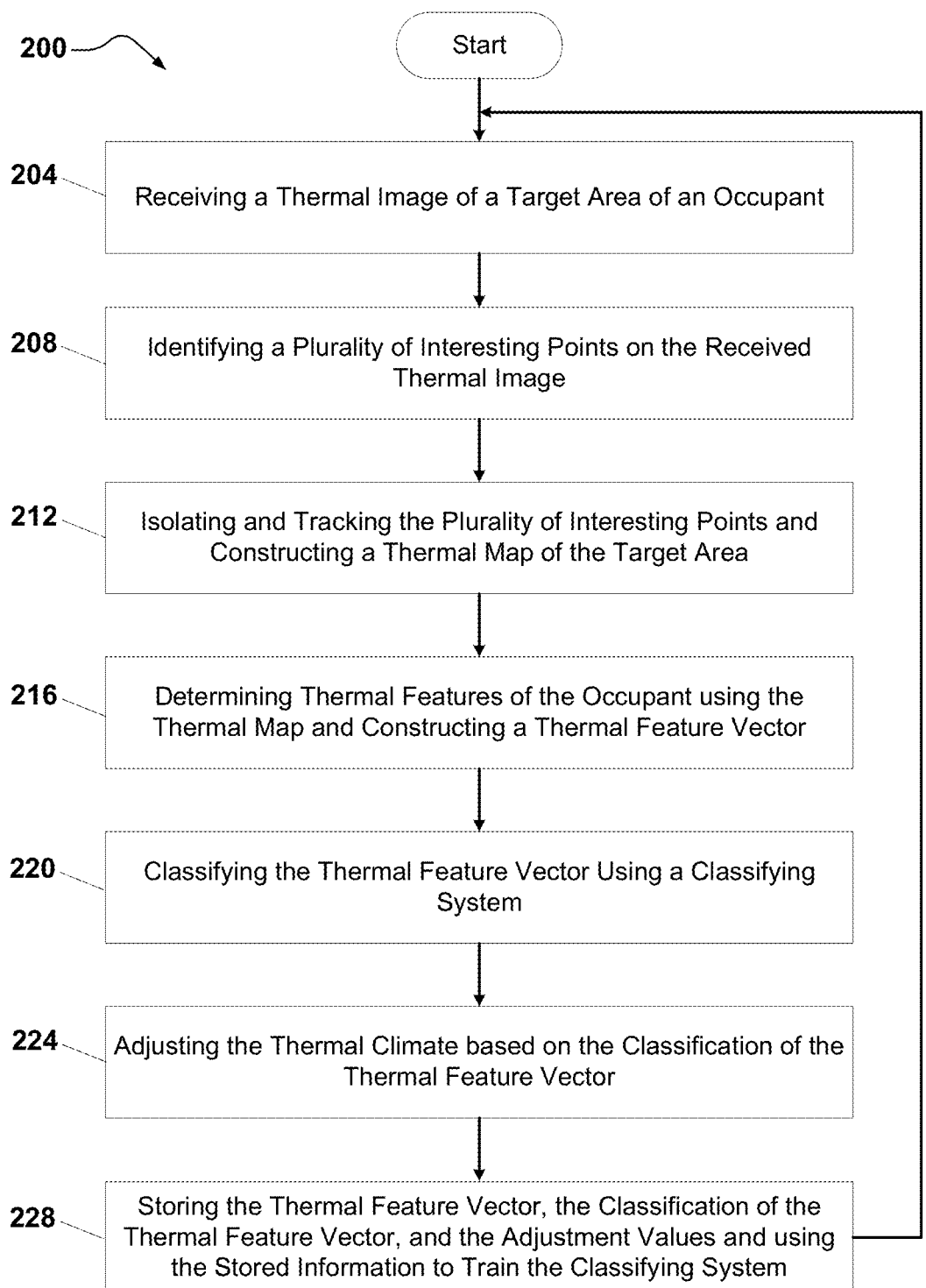
FIG. 2 is a flowchart illustrating an overview of an adaptable climate control method using thermal imaging.
Figure 4C:
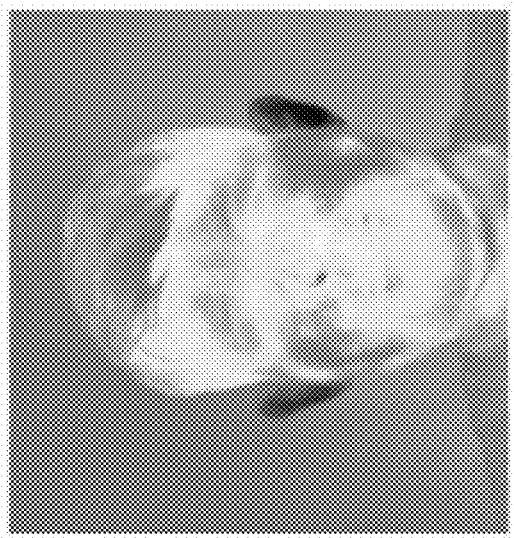
FIG. 4C is an example thermal image of the occupant of a confined space experiencing a hot-discomfort thermal state.
Figure 4B:
FIG. 4B is an example thermal image of the occupant of a confined space experiencing a cold-discomfort thermal state.
Figure 4A:
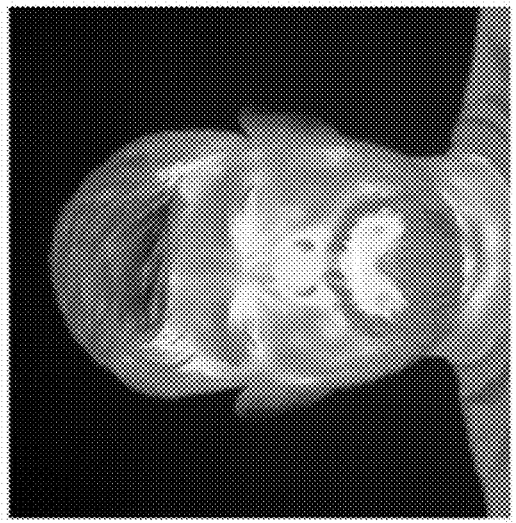
FIG. 4A is an example thermal image of the occupant of a confined space experiencing a comfortable thermal state.

FIG. 2 provides an overview of an adaptable climate control method 200 that uses thermal imaging. The method 200 comprises, for example, at 204 receiving, by the controller or computer processor 104, a thermal image of a target area of an occupant or subject within a vehicle or building. The thermal image may be captured by and received from one or more thermal cameras 108. For example, in certain aspects, the thermal image may be captured or collected using a FLIR SC67000 thermal camera having a resolution of 640×512 and a 7.2 M electrons capacity, reaching a frame rate of approximately 120 frames per second. The target area captured by the thermal camera 108 may be any area of exposed skin, for example, the occupant's face and/or neck. For example, FIGS. 4A-4C provide example thermal images of an occupant's face. More particularly, FIG. 4A is a thermal image of an occupant experiencing a comfortable thermal state, FIG. 4B is a thermal image of an occupant experiencing a cold thermal state, and FIG. 4C is a thermal image of an occupant experiencing a hot thermal state.

Figure 5:
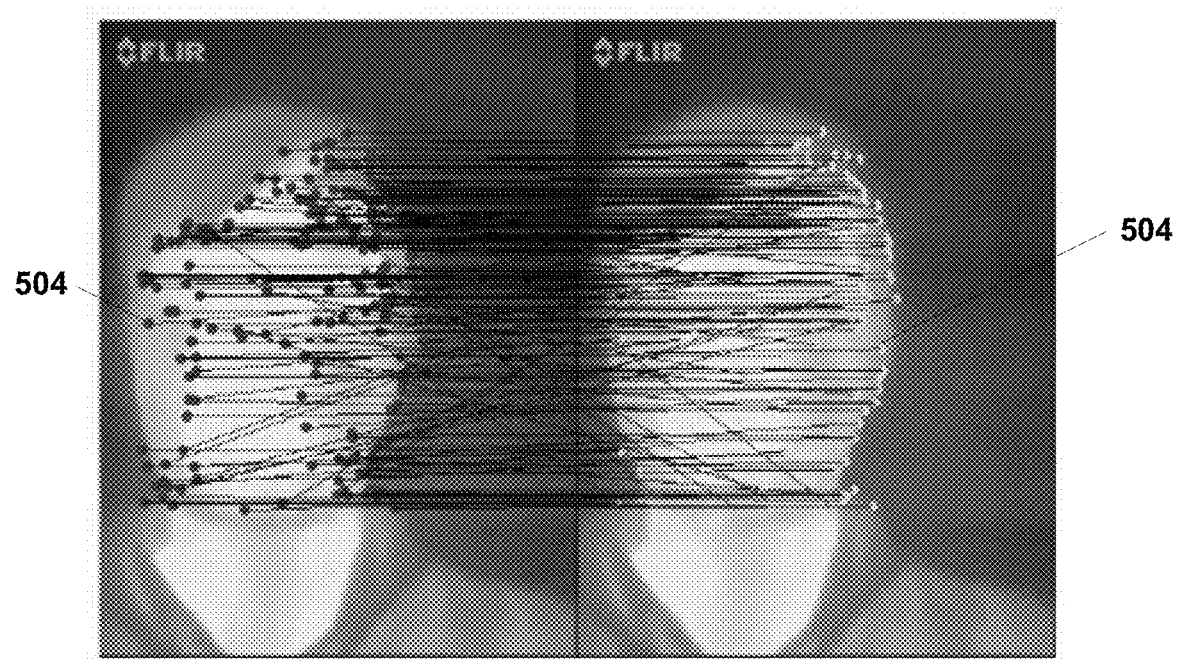
FIG. 5 is an example of the identification and tracking of interesting points across example thermal images of the occupant in a confined space.

The method 200, illustrated in FIG. 2, further comprises at 208 identifying, by the controller or computer processor 104, a plurality of interesting points of the received thermal image. For example, FIG. 5 illustrates the tracking of interesting points 504 between consecutive thermal images. In certain instances, the interesting points may be identified using at least one of a Shi-Tomasi corner detection algorithm, a minimum eigenvalue algorithm, or a Harris-Stephens algorithm by computing the weighted sum of square difference between two successive frames. The pixel values represent actual temperatures and the interesting points may be located where sharper changes in temperature exist. For example, because blood flow plays a critical role in heat transfer between the body core and the skin, the interesting points may correspond with the existence of various blood vessels that control, in many instances, the temperature of the surrounding region. For example, in hot weather vasodilation occurs, which results in an increasing width of the blood vessels, while in cold weather vasoconstriction occurs resulting in narrowing of the blood vessels in the body to decrease blood flow and reserve heat.

The method 200, illustrated in FIG. 2, further comprises at 212 isolating and tracking, by the controller or computer processor 104, the plurality of interesting points to construct a thermal map of the target area. More particularly, background data may be eliminated from the thermal images and the interesting points may be tracked over a predetermined period of time. In certain instances, the interesting points may be tracked using a fast Kanade-Lucas-Tomasi ("KLT") tracking algorithm. Suited to the visual texture of the thermal images, the algorithm may assume a small displacement between the pixels in two successive frames. In some aspects, the accuracy of the tracking approach may be improved by using Forward-Backward Error method. For example, the Forward-Backward Error can be calculated by tracking the interesting points back and forth between thermal frames in order to eliminate outliers and avoid the uncertainty with some points. The interesting points may be mapped to construct the thermal map of the target area. In certain instances, the interesting points may be mapped and the thermal map constructed using a geometrical transformation method that is based on similarity in order to reconstruct the tracked region.

The method 200 further comprises at 216 determining, by the controller or computer processor 104, thermal features of the vehicle or building occupant using the thermal map and constructing a thermal feature vector. More particularly, control 104 may use statistical measurements from the thermal map to determine the thermal features of the vehicle or building occupant and one or more of the thermal features may be combined to form the thermal feature vector.

In various aspects, the thermal features determined using raw data from the thermal map may include an average of the pixel values representing the temperatures of the plurality of interesting points, a maximum pixel value representing the highest temperature in the target area, a minimum pixel value representing the lowest temperature in the target area, a mean of the 10% highest pixel values in the target area, and a standard deviation between the pixel values within the target area, which measures the difference between the minimum and maximum temperatures. It is further envisioned that in certain instances, additional thermal features may be determined using the raw data of the thermal map, including, for example, the minimum temperature for each quadrant of the target area and/or a temperature histogram that represents the distribution of temperatures within the target area. In certain instances, the thermal features may be determined using a Hue Saturation Value ("HSV") pixel representation. The HSV pixel representation may include a plurality of channels that represent the colors of the pixels using cylindrical coordinates. Hue is the angular dimension locating different colors at different angles. The distance from the central axis of the cylinder to the outer surface may be referred to as Saturation and represents the purity of the colors. The height of the cylinder refers to the Value channel and represents the brightness of the colors. For example, using the HSV pixel representation one or more of the average of the pixel values representing the temperatures of the plurality of interesting points, the maximum pixel value representing the highest temperature in the target area, the minimum pixel value representing the lowest temperature in the target area, the mean of the 10% highest pixel values in the target area, and the standard deviation between the pixel values within the target area may be extracted from or determined from the thermal map.

In various aspects, the thermal feature vectors may be constructed from a combination of one or more of the thermal features. For example, each of the one or more of the thermal features may be an element in the thermal feature vector. The thermal feature vector may comprise one or more of the average of the pixel values representing the temperatures of the plurality of interesting points, the maximum pixel value representing the highest temperature in the target area, the minimum pixel value representing the lowest temperature in the target area, the mean of the 10% highest pixel values in the target area, and the standard deviation between the pixel values within the target area.

The method 200 further comprises at 220, the controller or computer processor 104, using a classifying or detection system to classify the thermal feature vector. For example, the computer process 104 may use one or more classifiers. Training instances may be used to learn the differences between different discomfort stages and to train the classifier and the classifier may then be used to predict the comfort stage in new, unseen instances. In certain instances, the thermal feature vector is classified using a classification method, such as a decision tree classifier method, a support vector machine classifier method, or a random forest classifier method. For example, a decision tree classifier method may be used to detect the comfort state, as well as different discomfort states of the subject using a leave-one-subject-out validation scheme.

The method 200 further comprises at 224, adjusting the thermal climate of at least a portion of the vehicle or building based on the classification of the thermal feature vector. More particularly, the controller or computer processor 104 may be in further communication with a thermal climate control system 116 of the vehicle or building, such as a HVAC system of a vehicle or building. For example, if a cold state is identified using the classifying system at 220, control 104 at 224 may increase the temperature of the vehicle or building by a predetermined amount (e.g., 2 degrees Celsius). Likewise, if a hot state is identified using the classifying system at 220, control 104 at 224 may decrease the temperature of the vehicle or building by a predetermined amount. If a comfortable state is identified using the classifying system at 220, control 104 may maintain the thermal state at 224. It is envisioned that in certain embodiments, that adjustments to the thermal climate of the vehicle or building would include adjustments to fan and/or blower speed and/or start the air condition compressor system.

Following appropriate adjustments, control 104 may reinitiate the method 200 at 204. In this manner, method 200 may be an automatic and continuous process that continuously monitors the thermal comfort of the subject within the vehicle or building and adjusts the thermal climate based on the perceived thermal comfort.

In certain instances, as seen at 228, the controller or computer processor 104 may store the thermal feature vector, the classification of the thermal feature vectors, and the adjustment values. The controller or computer processor 104 may use the stored information to further train the classification system prior to or during the continuation of control at 204. In this manner, method 200 is an automatic and continuous process that continuously monitors the thermal comfort of the subject within the vehicle or building and adjusts the thermal climate based on the perceived thermal comfort using a continuously tuned and personalized classifying system. As such, the adaptable climate control method 200 can be used to continuously learn the general thermal markers of comfort and/or discomfort across several occupants so to provide a model that is generalizable and that can be applied generally to any occupant or to continuously personalize the thermal climate to one or more single occupants.

Figure 3A:
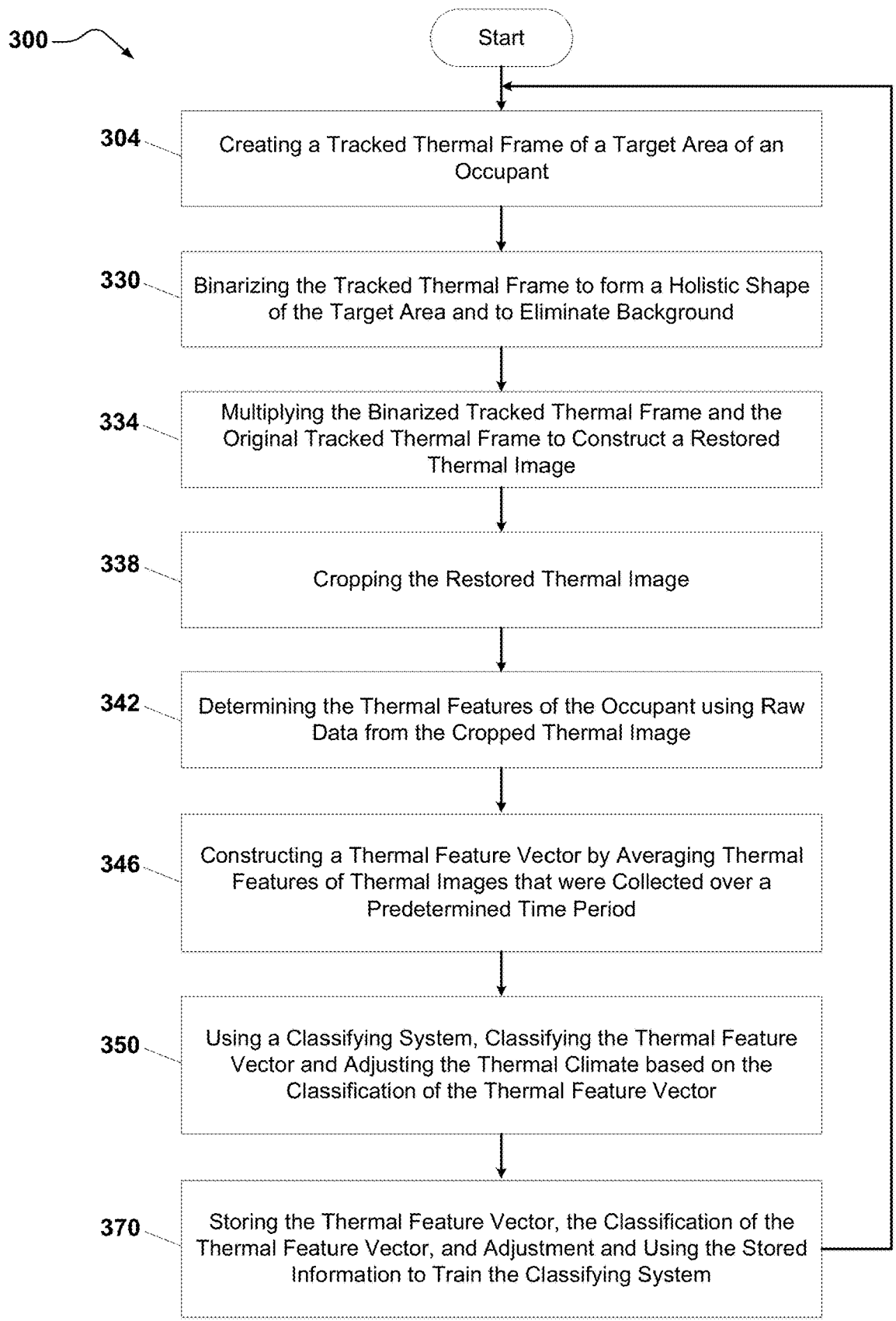
FIG. 3A is a flowchart illustrating an example embodiment of an adaptable climate control method using thermal imaging.

FIG. 3A depicts an example embodiment of an adaptable climate control method 300 that uses thermal imaging. The method comprises at 304 creating, by the controller or computer processor 104, a tracked thermal frame of a target area of an occupant or subject within a vehicle or building. For example, control 104 may undertake the steps illustrated in FIG. 3B, as further detailed below, to create the tracked thermal frame of the target area of the occupant.

Figure 6:
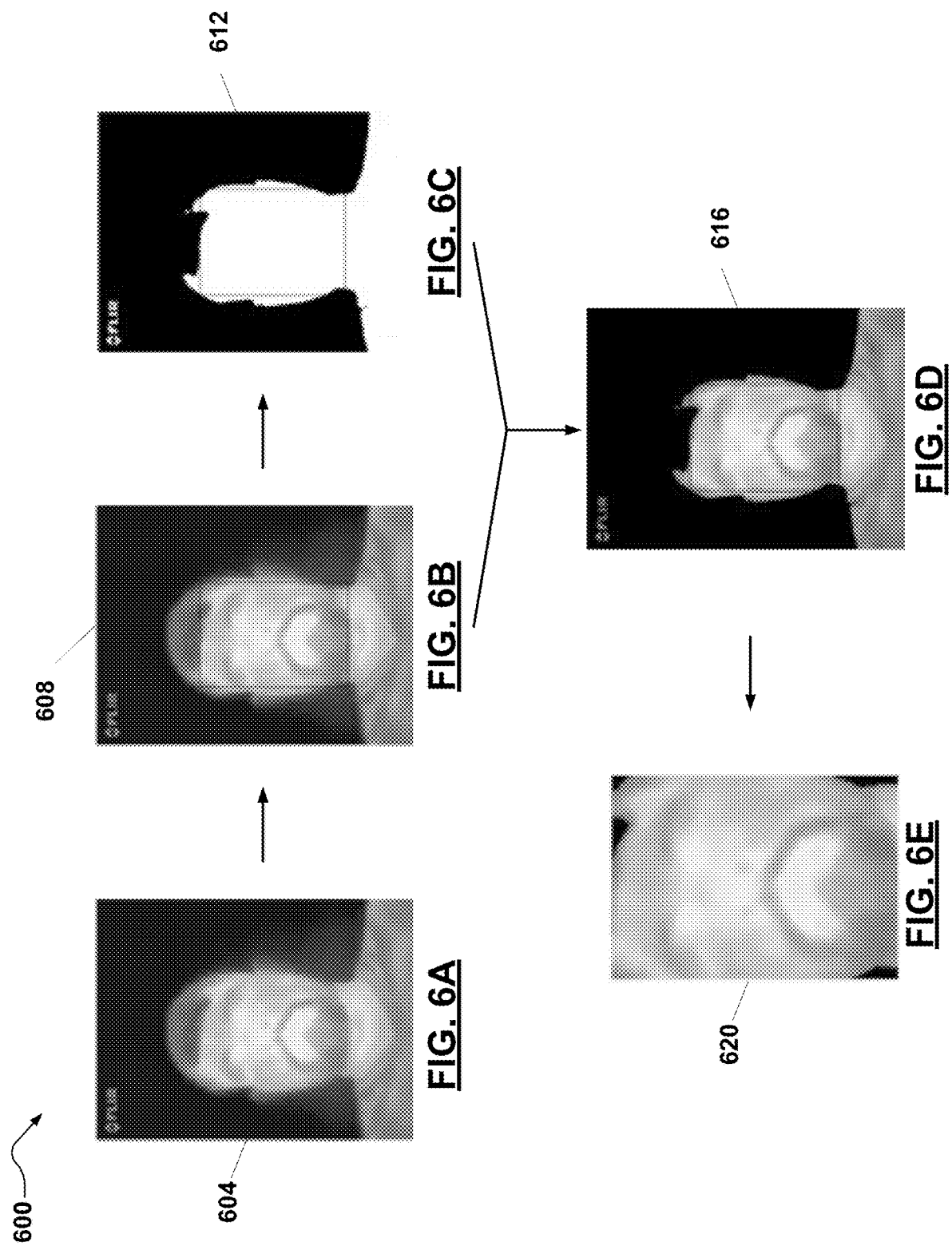
FIG. 6A is an example thermal image of the occupant of a confined space.
FIG. 6B illustrates example segmentation of the example thermal image of FIG. 6A.
FIG. 6C illustrates example binarization of the segmented thermal image of FIG. 6B.
FIG. 6D illustrates an example restored thermal image formed from the segmented thermal image of FIG. 6B and the binarized thermal image of FIG. 6C.
FIG. 6E illustrate an example cropped image of the restored thermal image of FIG. 6D.

The method 300, illustrated in FIG. 3A, further comprises at 330 binarizing, by the controller or computer processor 104, the tracked thermal frame to form a holistic shape of the target area and eliminate background. Binarization occurs under the assumption that the background(s) of the target area(s) are not heat emitting sources. Hence, a threshold temperature can be determined to isolate the background from heat emitting sources, such as the target areas of the subjects. As illustrated in FIG. 6C, the background is transformed into black pixels to form a binarized tracked thermal frame 612. For comparison, FIG. 6B illustrates the original tracked thermal frame 608 of the target area of the vehicle or building occupant.

The method 300, illustrated in FIG. 3A, further comprises at 334 multiplying, by the controller or computer processor 104, the binarized tracked thermal frame and the original tracked thermal frame to construct a restored thermal image. The binarized image contains pixels with value of zero that represent the background and pixels of value one representing the target area. Hence, the multiplication process restores the actual pixel values of the target area while still eliminating the background. For example, FIG. 6D illustrates a restored thermal image 616 resulting from the combination of the binarized tracked thermal frame 612 and the original tracked thermal frame 608.

The method 300, illustrated in FIG. 3A, further includes at 338 cropping, by the controller or computer processor 104, the restored thermal image 616. Cropping the target area ensures that not only the background is eliminated, but other areas that are emitting heat from the subjects, such as their shoulders, are eliminated as well. Cropping is performed after the target area is reconstructed in the tracked thermal image using geometrical transformation. For example, FIG. 6E illustrates a cropped thermal image of the restored thermal image 616. In this example, the face is isolated by cropping. After cropping, control 104 continues to 342 of the method 300 illustrated in FIG. 3A. At 342, similar the process employed in 216, as illustrated in FIG. 2, control 104 determines thermal features of the vehicle or building occupant using raw data from the cropped thermal image. At 346, control 104 constructs a thermal feature vector by averaging the thermal features of consecutive thermal images captured over a predetermined time period.

The method 300 further comprises at 350 using a classifying system to classify the thermal feature vector and adjust the thermal climate of the vehicle or building based on the classification of the thermal feature vector. For example, control 104 may undertake the steps illustrated in either FIG. 3B or FIG. 3C, as further detailed below, to classify the thermal feature vector and adjust the thermal climate of the vehicle or building. Control 104 detects at least one of a cold state, a comfort state, and a hot state of the occupant. The method 300, as illustrated in FIG. 3A, may store the thermal feature vector, the classification of the thermal feature vector, and the adjustment value at 370, similar to 228, as illustrated in FIG. 2. The controller or computer processor 104 may use the stored information to further train and personalize and/or generalize the classification system prior to or during the continuation of control at 304.

Figure 3B:
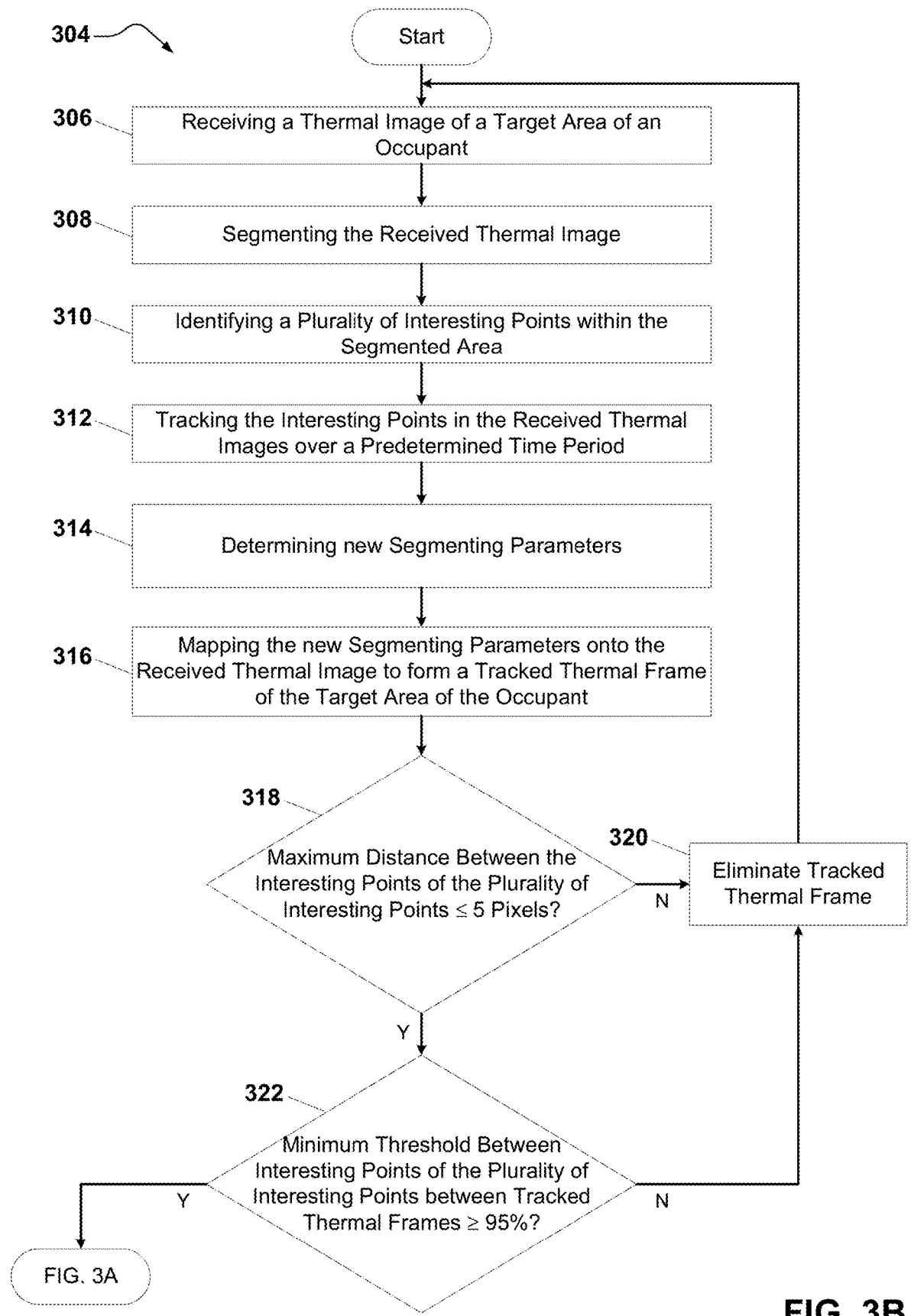
FIG. 3B is a flowchart illustrating an example embodiment for creating a tracked thermal frame of a target area of a subject occupying a confined space.

FIG. 3B is a flowchart illustrating an example method 304 for creating the tracked thermal frame of the one or more target areas of the one or more occupants of the vehicle or building. Control begins at 306 by receiving a thermal image of the target area of the occupant. For example, FIG. 6A illustrates an example thermal image. The method 304, as illustrated in FIG. 3B, further comprises at 308 segmenting, by the controller or computer processor 104, the received thermal image. For example, FIG. 6B illustrates an example segmented thermal image.

The method 304, illustrated in FIG. 3B, further comprises at 308 identifying, by the controller or computer processor 104, a plurality of interesting points of the received thermal image within the segmented thermal image, similar to 208 of FIG. 2. The method 304, illustrated in FIG. 3B, further comprises at 312 tracking the interesting points in received thermal images over a predetermined time period. For example, in certain instances, the interesting points may be tracking using a Kanade-Lucas-Tomasi tracking algorithm as described above. After tracking, control 104 continues to 314 of method 304. At 304, the controller 104 determines new segmenting parameters such as the location of the interesting points that are located in the current thermal frame, outliers and noisy points, and the percentage of points that were successfully tracked, using, for example, a geometric transformation, which globally estimates the transformation of the interesting points based on similarity. Control 104 continues at 314 by mapping the new segmenting parameters onto the received thermal image to form the tracked thermal frame of the target area of the vehicle or building occupant.

The method 304 further comprises at 318 determining a maximum distance between the interesting points of the plurality of interesting points. If the maximum distance is less than or equal to a set number of pixels (e.g., 5 pixels) the method continues to 322. However, if the maximum distance is not less than or equal to 5 pixels the method continues to 320. The distance between two pixels in two successive frames should not be large using higher frame rates, such as ranging from about 60 to about 120. Setting a threshold reduces the chances of having noisy points that incorrectly indicate that there is a large displacement of pixels in the target area. At 322, control 104 compares the number of the interesting points of the plurality of interest points between tracked thermal frames. If the number of successfully tracked points is greater than or equal to a threshold (e.g. of 95%), the method continues to method step 330 illustrated in FIG. 3A. If the number is not greater than or equal to the threshold, the method continues to 320. At 320, control 104 eliminates or disregards the tracked thermal frame and data and returns to method step 306. This ensures an acceptable performance of the tracking process and that no instances of occlusion or movement of the subjects outside the view of the camera occurred.

Figure 3C:
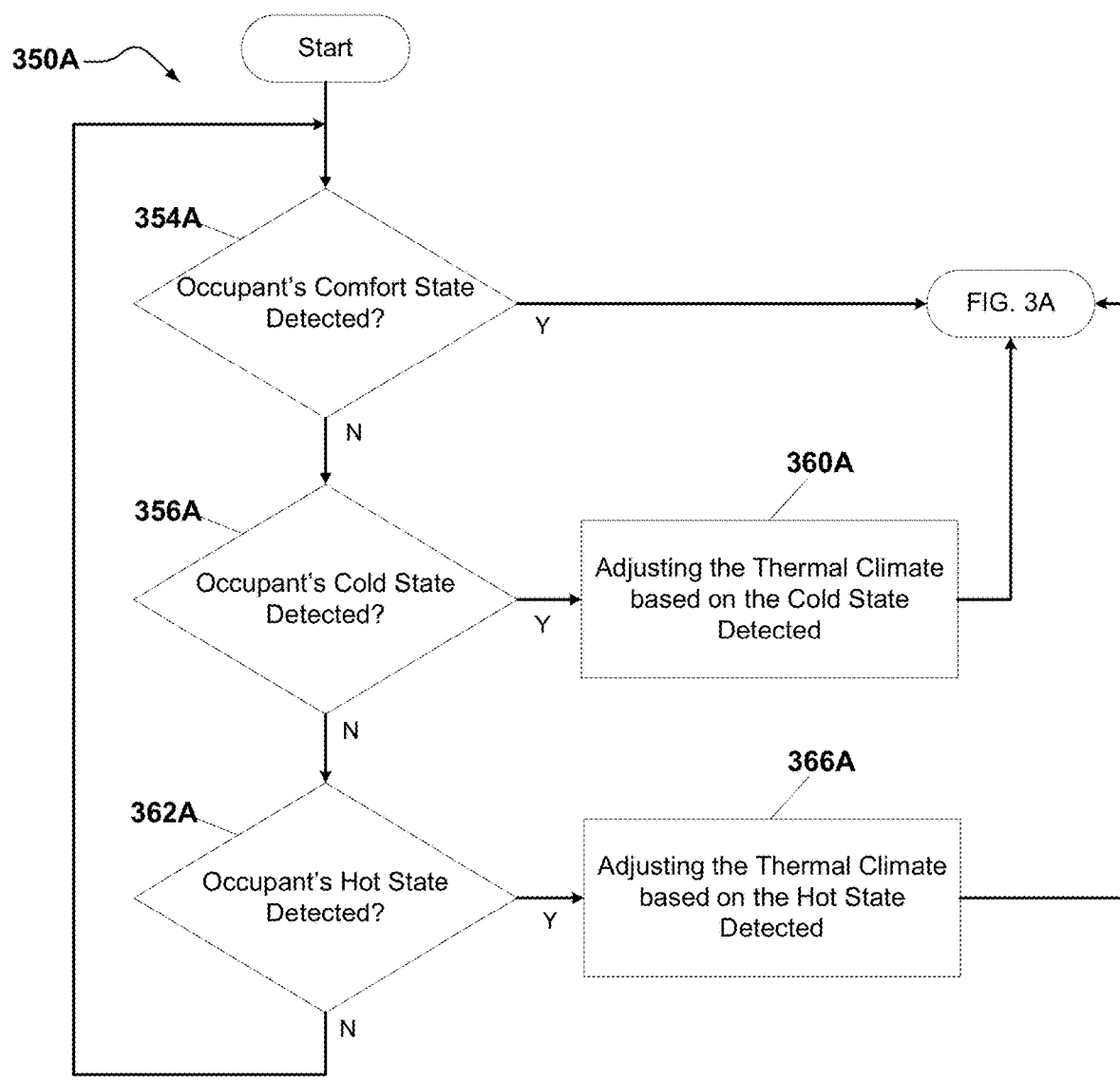
FIG. 3C is a flowchart illustrating an example embodiment of a classifying and adjustment system.

FIG. 3C is a flowchart illustrating an example method 350A for classifying the thermal feature vector and adjusting the thermal climate based on the classification of the thermal feature vector. At 354A, control 104 applies the classification system (e.g., decision tree classifier) and determines if the thermal feature vector indicates that the vehicle or building occupant is experiencing a comfortable thermal state. If a comfortable thermal state is indicated, control 104 continues to method step 370 illustrated in FIG. 3A. If a comfortable thermal state is not indicated, control continues to 356A.

At 356A, control 104 applies the classification system and determines if the thermal feature vector indicates that the vehicle or building occupant is experiencing a cold thermal state. If a cold thermal state is not indicated, control 104 continues to 362A. If a cold thermal state is indicated, control 104 continues to 360A. At 360A, control 104 adjusts the thermal climate of the vehicle or building based on the cold-state classification of the thermal feature vector and continues to method step 370 illustrated in FIG. 3A.

At 362A, control 104 applies the classification system and determines if the thermal feature vector indicates that the vehicle or building occupant is experiencing a hot thermal state. If a hot thermal state is not indicated, control 104 continues to 354A. If a hot thermal state is indicated, control 104 continues to 366A. At 366A, control 104 adjusts the thermal climate of the vehicle or building based on the hot-state classification of the thermal feature vector and continues to method step 370 illustrated in FIG. 3A.

Figure 3D:
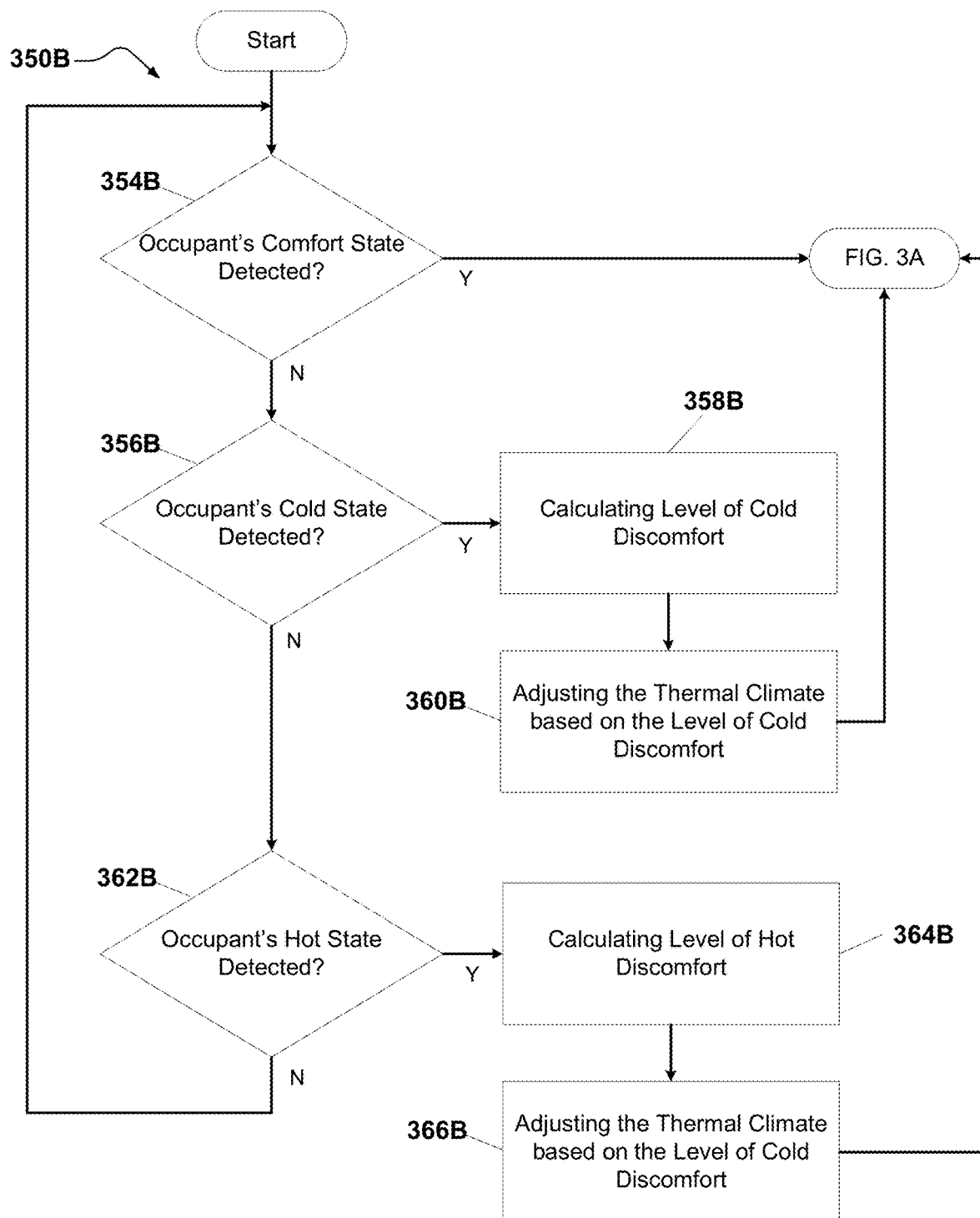
FIG. 3D is a flowchart illustrating another example embodiment of a classifying and adjustment system.

FIG. 3D is a flowchart illustrating another example method 350B for classifying the thermal feature vector and adjusting the thermal climate based on the classification of the thermal feature vector. The method illustrated in FIG. 3D is a cascaded system including three separate classification models within a two-stage classification framework. At 354B, control 104 applies the classification system (e.g., decision tree classifier) and determines if the thermal feature vector indicates that the vehicle or building occupant is experiencing a comfortable thermal state. If a comfortable thermal state is indicated, control 104 continues to method step 370 illustrated in FIG. 3A. If a comfortable thermal state is not indicated, control continues to 356B.

At 356B, control 104 applies the classification system and determines if the thermal feature vector indicates that the vehicle or building occupant is experiencing a cold thermal state. If a cold thermal state is not indicated, control 104 continues to 362B. If a cold thermal state is indicated, control 104 continues to 358B. Though a linear scheme is illustrated, the skilled artisan will appreciate that in various aspects, the determination of the cold and/or hot thermal states may occur simultaneously in a parallel configuration. At 358B, control 104 determines the level of cold discomfort being experienced by the occupant using a cold classification system. For example, the system detects if the subjects are feeling cool, cold, or very cold. After the level of cold discomfort is determined, control 104 continues to 360B. At 360B, control 104 adjusts the thermal climate of the vehicle or building using a factor based on the calculated level of cold discomfort and continues to method step 370 illustrated in FIG. 3A.

At 362B, control 104 applies the classification system and determines if the thermal feature vector indicates that the vehicle or building occupant is experiencing a hot thermal state. If a hot thermal state is not indicated, control 104 continues to 354B. If a hot thermal state is indicated, control continues to 364B. At 364B, control 104 determines the level of hot discomfort being experienced by the occupant using a hot classification system. For example, the system detects if the subjects are feeling warm, hot, or very hot. After the level of hot discomfort is determined, control 104 continues to 366B. At 366B, control 104 adjusts the thermal climate of the vehicle or building using a factor based on the calculated level of hot discomfort and continues to method step 370 illustrated in FIG. 3A.

Figure 7:
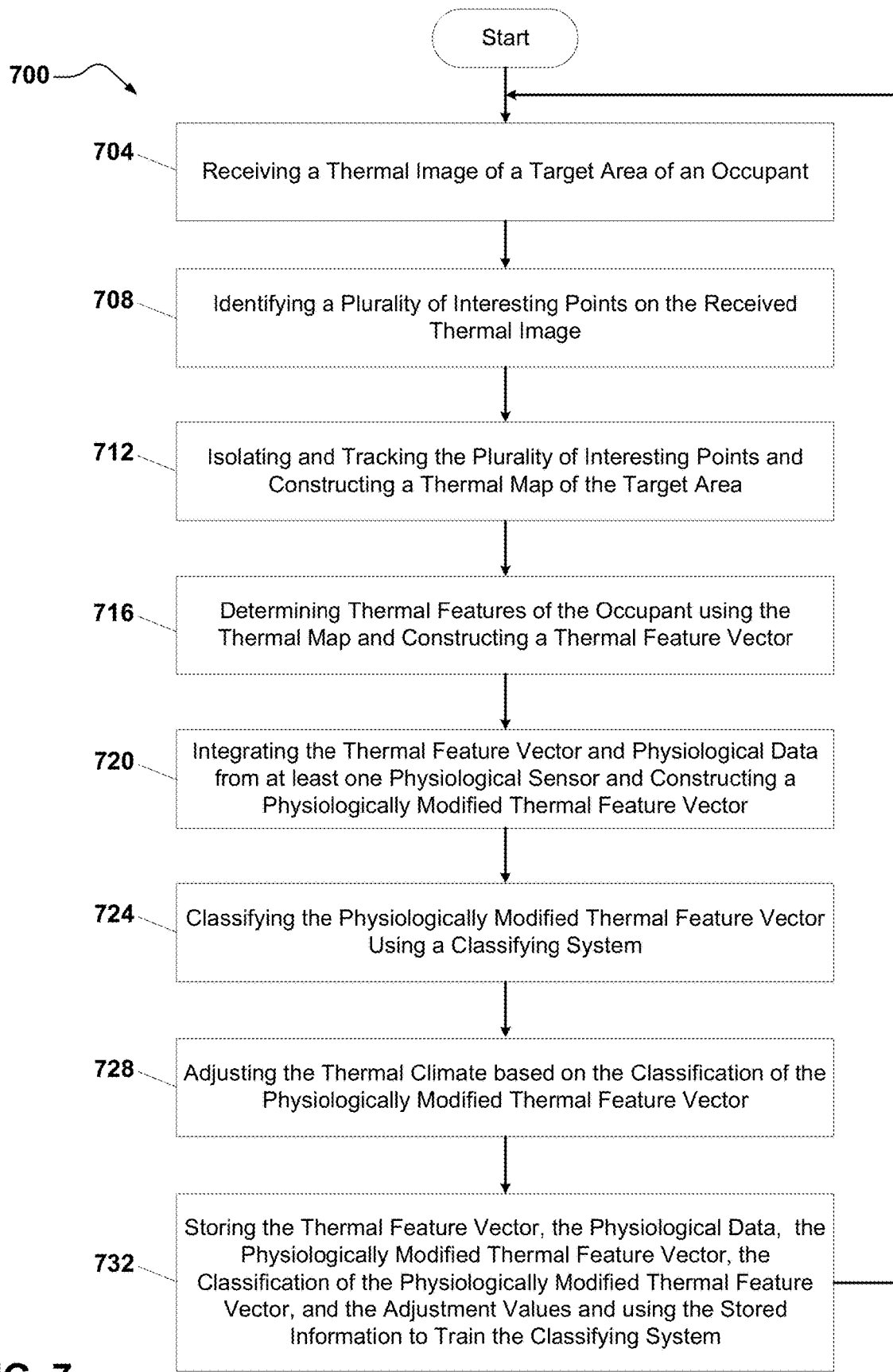
FIG. 7 is a flowchart illustrating an example embodiment of an adaptable climate control method using thermal imaging and physiological data.

FIG. 7 provides another example embodiment of an adaptable climate control method 700 that uses thermal imaging and physiological data in an early fusion system. Similar to method 200 illustrated in FIG. 2, the method 700 comprises at 704 receiving, by the controller or computer processor 104, a thermal image of a target area of an occupant or subject within a vehicle or building. Also, similar to the method 200 illustrated in FIG. 2, the method 700 further comprises at 708 identifying, by the controller or computer processor 104, a plurality of interesting points of the received thermal image and at 712 isolating and tracking the plurality of interesting points to construct a thermal map of the target area. At 716, the method 700 comprises determining, by the controller or computer processor 104, thermal features of the vehicle or building occupant using the thermal map and constructs a thermal feature vector.

At 720, the method 700 further comprises integrating into the thermal feature vector physiological data from at least one physiological sensor to form an integrated thermal feature vector. For example, in certain instances, physiological features may include one or more of the occupant's heart rate, blood volume pulse ("BVP"), skin conductance ("SC"), respiration rate ("RR"), and skin temperature ("ST"). The physiological data includes raw measurements and statistical descriptions, including maximum and minimum values, means, power means, standard deviations, and mean amplitudes (epochs). In addition, in certain instances, the physiological data may include inter-beat intervals ("IBI") measurements, such as minimum and maximum amplitudes and their intervals. In the instances of a vehicle, the physiological sensors may be incorporated into one or more of the driving wheel and the driver seat, as well as one or more of the passenger seats.

In this early fusion method, the physiological sensors are concatenated with the first thermal feature vector to construct a physiologically modified (or integrated) thermal feature vector. For example, the physiologically modified (or integrated) thermal feature vector may include one or more of the average of the pixel values representing the temperatures of the plurality of interesting points, the maximum pixel value representing the highest temperature in the target area, the minimum pixel value representing the lowest temperature in the target area, the mean of the 10% highest pixel values in the target area, the standard deviation between the pixel values within the target area, a histogram representing the temperature distribution in the target area, the occupant's heart rate, blood volume pulse, skin conductance, respiration rate, and skin temperature.

At 724 of method 700, the controller or computer processor 104 uses a classifying system to classify the physiologically modified thermal feature vector. The method 700 further comprises at 728, adjusting the thermal climate of the vehicle or building based on the classification of the physiologically modified thermal feature vector. As in FIG. 2, in certain instances, method 700 may further comprise storing, by the controller or computer processor 104, of the thermal feature vector, the physiological data, the physiologically modified thermal feature vector, the classification of the physiologically modified thermal feature vector, and the adjustment values. The controller or computer processor 104 may use the stored information to further train the classification system prior to or during the continuation of control at 704.

Figure 8:
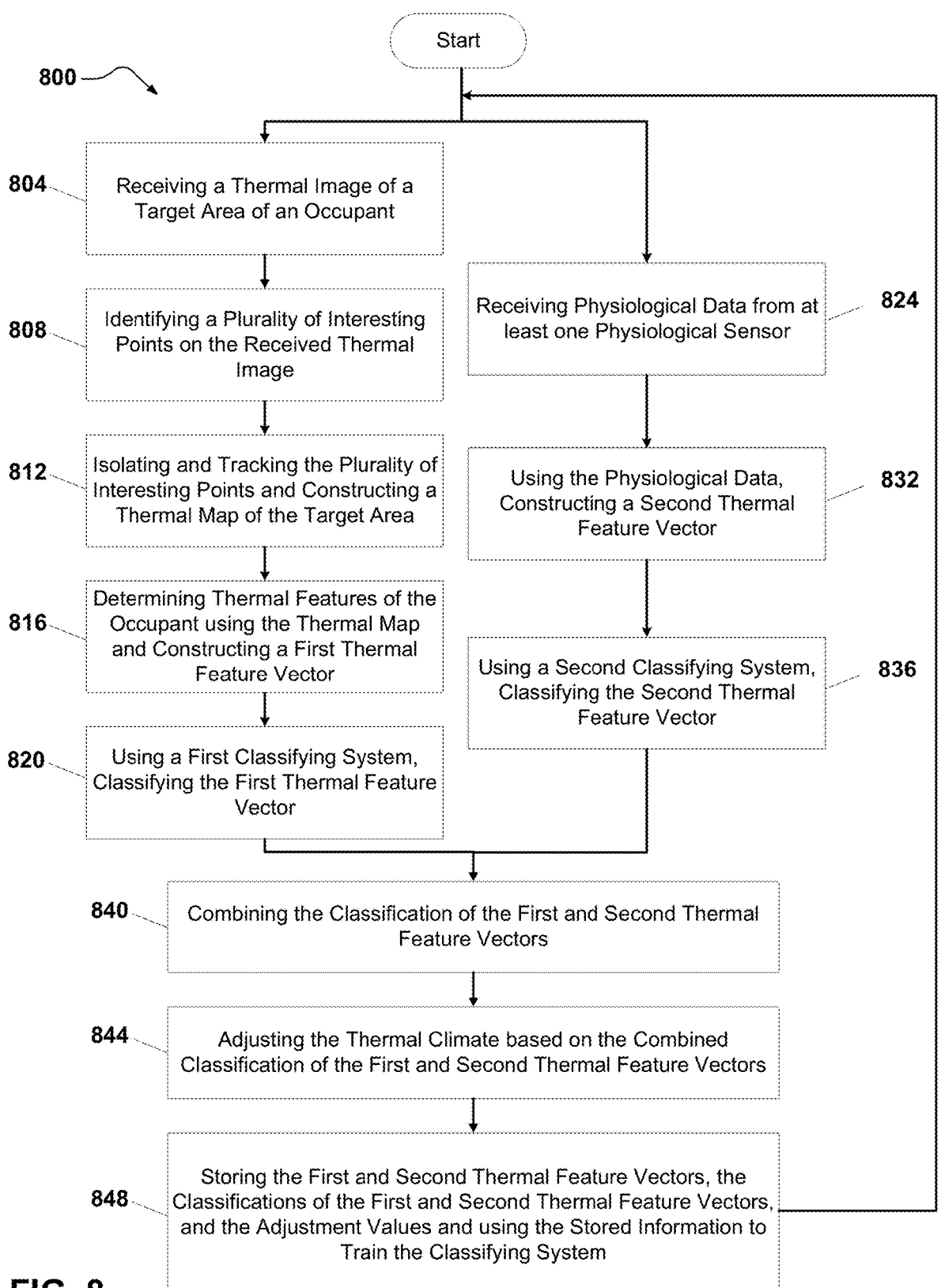
FIG. 8 is a flowchart illustrating another example embodiment of an adaptable climate control method using thermal imaging and physiological data.

FIG. 8 provides another example embodiment of an adaptable climate control method 800 that uses thermal imaging and physiological data in a late fusion system. Similar to method 200 illustrated in FIG. 2, the method 800 comprises at 804 receiving, by the controller or computer processor 104, a thermal image of a target area of an occupant or subject within a vehicle or building. Also, similar to the method 200 illustrated in FIG. 2, the method 800 further comprises at 808 identifying, by the controller or computer processor 104, a plurality of interesting points of the received thermal image and at 812 isolating and tracking the plurality of interesting points to construct a thermal map of the target area. At 816, the method 800 comprises determining, by the controller or computer processor 104, thermal features of the vehicle or building occupant using the thermal map and constructs a first thermal feature vector. At 820, control 104 continues and, using a first classifying system, classifies the first thermal feature vector.

The method 800 further includes at 824 receiving, by the controller or computer processor 104, physiological data from at least one physiological sensor and at 832 using the physiological data to construct a second thermal feature vector. At 836, control 104 continues and using a second classifying system classifies the second thermal feature vector. The method, at 840, includes combining, by the controller or computer processor 104, the classification of first thermal feature vector from 820 and the classification of the second thermal feature vector from 836.

The method 800 further comprises at 844, adjusting the thermal climate of the vehicle or building based on the combined classifications of the first and second thermal feature vectors. As in FIG. 2, in certain instances, method 800 may further comprise storing, by the controller or computer processor 104, of the first and second thermal feature vectors, the classification of the first and second thermal feature vectors, and the adjustment values. The controller or computer processor 104 may use the stored information to further train the classification system prior to or during the continuation of control at 804 and 824.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying," or the like, refer to the action and processes of a computer system, or similar electronic computing device, that manipulates and transforms data represented as physical (electronic) quantities within the computer system memories or registers, or other such information storage, transmission, or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adaptable climate control method for controlling a thermal climate of a confined space based on thermal features of an occupant of the confined space, the method comprising:
    receiving, by a computer processor, a thermal image of a target area of the occupant, wherein the thermal image is captured by and received from one or more thermal cameras and the computer processor is not configured to receive visual images;
    identifying, by the computer processor, a plurality of interesting points of the received thermal image, wherein pixel values define the interesting points and are actual temperatures;
    isolating, by the computer processor, the plurality of interesting points to construct a thermal map of the target area;
    determining, by the computer processor, the thermal features of the occupant using raw data of the thermal map of the target area;
    constructing, by the computer processor, a thermal feature vector using the thermal features of the occupant;
    classifying, by the computer processor, the thermal feature vector using one or more classifiers; and
    adjusting, by the computer processor, at least a portion of the thermal climate of the confined based on the classification of the thermal feature vector.

2. The method of claim 1, wherein the method further comprises:
    storing, by the computer processor, the thermal feature vector and the classification of the thermal feature vector; and
    training, by the computer processor, the one or more classifier using the stored information.

3. The method of claim 1, wherein when applying the one or more classifiers, the computer processor detects at least one of a cold state, a comfort state, and a hot state of the occupant.

4. The method of claim 3, wherein when applying the one or more classifiers, the computer processor further calculates a level of discomfort in at least one of the cold state and the hot state of the occupant.

5. The method of claim 1, wherein the one or more classifiers are embedded in a supervised classification method.

6. The method of claim 1, wherein isolating the plurality of interesting points to construct the thermal map comprises:
binarizing, by the computer processor, the received thermal image to form a binarized thermal image, wherein the binarized thermal image is a holistic shape of the target area of the occupant;
multiplying, by the computer processor, the binarized thermal image and the received thermal image to construct a restored thermal image of the target area; and
cropping, by the computer processor, the restored thermal image to construct the thermal map of the target area.

7. The method of claim 1, wherein the thermal feature vector is constructed from a plurality of thermal images collected over a predetermined time period.

8. The method of claim 1, wherein the method further comprises:
receiving, by the computer processor, physiological data from at least one physiological sensor;
integrating, by the computer processor, the physiological data as one or more additional elements into the thermal feature vector to form an integrated thermal feature vector;
classifying, by the computer processor, the integrated thermal feature vector using the one or more classifiers; and
adjusting, by the computer processor, the thermal climate of the confined space using the classification of the integrated thermal feature vector.

9. The method of claim 8, wherein the computer processor further integrates as one or more other additional element into the thermal feature vector to form a further integrated thermal feature vector information relating to the occupant including at least one of the occupant's clothing and metabolic rate.

10. The method of claim 8, wherein the computer processor further integrates as one or more other additional element into the thermal feature vector to form a further integrated thermal feature vector information relating to the environment of the confined space.

11. The method of claim 10, wherein the environmental information includes data relating to environmental humidity.

12. The method of claim 1, wherein the interesting points correspond with areas having higher concentrations of blood vessels as compared to the surrounding areas.

13. The method of claim 1, wherein a maximum distance between each interesting point of the plurality of interesting points is less than or equal to about 5 pixels.

14. An adaptable climate control method for controlling a thermal climate of a vehicle or building based on thermal features of one or more occupants of the vehicle or building, the method comprising:
receiving, by a computer processor, a first thermal image of a target area of a first occupant and a first set of physiological data from a first physiological sensor in communication with the first occupant, wherein the thermal image is captured by and received from one or more thermal cameras and the computer processor is not configured to receive visual images;
identifying, by the computer processor, a first plurality of interesting points on the received first thermal image, wherein pixel values define the first plurality of interesting points and are actual temperatures;
isolating, by the computer processor, the first plurality of interesting points to construct a first thermal map of the target area of the first occupant;
determining, by the computer processor, the thermal features of the first occupant using raw data of the first thermal map of the target area;
constructing, by the computer processor, a first thermal feature vector using the thermal features of the first occupant;
integrating, by the computer processor, a first set of physiological data as one or more additional element into the first thermal feature vector to form a first integrated thermal feature vector;
detecting, by the computer processor, at least one of a cold state, a comfort state, and a hot state of the first occupant using the first integrated thermal feature; and
adjusting, by the computer processor, the thermal climate of the vehicle or building based on the detection of one of the cold state or the hot state.

15. The method of claim 14, wherein the method further includes:
receiving, by the computer processor, a second thermal image of a target area of a second occupant and a second set of physiological data from a second physiological sensor in communication with the second occupant;
identifying, by the computer processor, a second plurality of interesting points on the received second thermal image, wherein pixel values define the second plurality of interesting points representing actual temperatures-;
isolating, by the computer processor, the second plurality of interesting points to construct a second thermal map of the target area of the second occupant;
determining, by the computer processor, the thermal features of the second occupant using raw data of the second thermal map of the target area;
constructing, by the computer processor, a second thermal feature vector using the thermal features of the second occupant;
integrating, by the computer processor, a second set of physiological data as one or more additional element into the second thermal feature vector to form a second integrated thermal feature vector; and
detecting, by the computer processor, at least one of a cold state, a comfort state, and a hot state of the second occupant using the second integrated thermal feature vector.

16. The method of claim 15, wherein the method further includes:
determining a level of cold state discomfort or a level of hot state discomfort of the first occupant; and
determining a level of cold state discomfort or a level of hot state discomfort of the second occupant.

17. The method of claim 16, wherein the computer processor adjusts the thermal climate of the vehicle or building based on a combination of the level of cold state discomfort or the level of hot state discomfort of the first occupant and the level of cold state discomfort or the level of hot state discomfort of the second occupant.

18. The method of claim 15, wherein adjusting is a first adjustment of a first portion of the thermal climate based on the detection of one of the cold state or the hot state of the first occupant, and the method further includes a second adjustment of a second portion of the thermal climate based on the detection of one of the cold state or the hot state of the second occupant.

19. The method of claim 18, wherein the method further includes:
- storing, by the computer processor, the first and second thermal feature vectors, the first and second integrated thermal feature vectors, the detection of the first and second thermal feature vectors, and the first and second adjustments; and
- training, by the computer processor, the detection system using the stored information.

20. The method of claim 15, wherein isolating the first plurality of interesting points to construct the first thermal map and isolating the second plurality of interesting points to construct the second thermal map each comprises:
- binarizing, by the computer processor, the received first or second thermal image to form binarized image, wherein the binarized image is a holistic shape of the target area of the first or second occupant;
- multiplying, by the computer processor, the binarized first or second thermal image and the received first or second thermal image to construct a restored first or second thermal image of the target area; and
- cropping, by the computer processor, the restored first or second thermal image to construct the first or second thermal map of the target area.

* * * * *

UNITED STATES PATENT AND TRADEMARK OFFICE
CERTIFICATE OF CORRECTION

PATENT NO. : 11,631,259 B2
APPLICATION NO. : 16/671841
DATED : April 18, 2023
INVENTOR(S) : Mihai G. Burzo et al.

It is certified that error appears in the above-identified patent and that said Letters Patent is hereby corrected as shown below:

In the Claims

Column 16, Claim 15, Line 34, delete "temperatures-;" and insert --temperatures;--.

Signed and Sealed this
Fourth Day of July, 2023

Katherine Kelly Vidal
*Director of the United States Patent and Trademark Office*